United States Patent [19]

Hayakawa et al.

[11] Patent Number: 6,003,127
[45] Date of Patent: *Dec. 14, 1999

[54] PIPELINE PROCESSING APPARATUS FOR REDUCING DELAYS IN THE PERFORMANCE OF PROCESSING OPERATIONS

[75] Inventors: Hiroshi Hayakawa, Nagoya; Harutsugu Fukumoto, Anjo; Hiroaki Tanaka, Okazaki, all of Japan

[73] Assignee: Nippondenso Co., Ltd., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,709

[22] Filed: Oct. 4, 1996

[30] Foreign Application Priority Data

Oct. 4, 1995 [JP] Japan ................................. 7-257725
Oct. 6, 1995 [JP] Japan ................................. 7-260409

[51] Int. Cl.$^6$ ...................................................... G06F 9/40
[52] U.S. Cl. ................................................................ 712/234
[58] Field of Search ......................................... 712/234, 235

[56] References Cited

U.S. PATENT DOCUMENTS

| 4,760,519 | 7/1988 | Papworth et al. ...................... 395/393 |
| 4,777,587 | 10/1988 | Case et al. .............................. 395/582 |
| 5,088,030 | 2/1992 | Yoshida .................................. 395/584 |
| 5,202,967 | 4/1993 | Matsuzaki .............................. 395/388 |
| 5,317,703 | 5/1994 | Hiraoka et al. . | |
| 5,333,284 | 7/1994 | Nugent .................................. 395/375 |

FOREIGN PATENT DOCUMENTS

| 63-5433 | 1/1988 | Japan . |
| 2-254541 | 10/1990 | Japan . |
| 4-60720 | 2/1992 | Japan . |
| 4-98426 | 3/1992 | Japan . |
| 5-2494 | 1/1993 | Japan . |
| 5-73310 | 3/1993 | Japan . |
| 5-224926 | 9/1993 | Japan . |
| 5-257875 | 10/1993 | Japan . |
| 5-298095 | 11/1993 | Japan . |
| 6-161751 | 8/1994 | Japan . |
| 7093150 | 4/1995 | Japan . |

OTHER PUBLICATIONS

"RISC System" translated by Ohmori; Nov. 1, 1991; p. 75.
"SH7000 Series Programming Manual (1st Edition)"; Sep. 1993; p. 148.
"H08/300 Series Programming Manual (3rd Edition)"; Mar. 1993; p. 69.
"Quantitative Approach for Computer Architecture Design, Realization, and Evaluation (Nikkei BP)" May 31, 1993.

*Primary Examiner*—David Y. Eng
*Attorney, Agent, or Firm*—Pillsbury Madison & Sutro

[57] ABSTRACT

A pipeline processing apparatus for performing processing operations in a succession of processing cycles, in which each cycle is composed of a succession of stages that include an instruction decoding stage for decoding an instruction associated with the cycle and an execution stage for executing an operation dependent on the instruction, and the processing cycles include a first cycle which starts at a first time and a second cycle that begins at a second time that is after the first time and that overlaps the first cycle in time. The apparatus is constructed and controlled for causing a branch instruction to be decoded in the instruction decoding stage of the first cycle; and for effecting a calculation in the execution stage of the first cycle, dependent on the branch instruction decoded in the instruction decoding stage of the first cycle.

3 Claims, 9 Drawing Sheets

| IF | ID | EX | MA | WB |    |    |    |    |
|    | IF | ID | EX | MA | WB |    |    |    |
|    |    | IF | ID | EX | MA | WB |    |    |
|    |    |    | IF | ID | EX | MA | WB |    |
|    |    |    |    | IF | ID | EX | MA | WB |
|    |    |    |    |    | IF | ID | EX | MA | WB |

(A) CONDITION ESTABLISHED (B) CONDITION NOT ESTABLISHED

PIPELINE PROCESSING APPARATUS FOR REDUCING DELAYS IN THE PERFORMANCE OF PROCESSING OPERATIONS

BACKGROUND OF THE INVENTION

1. Field of the Invention

This invention relates to a speed-up technique for realizing a quick processing in response to a branch instruction or in an exceptional treatment or handling based on an internal vector.

2. Related Art

In general, instruction address operations in a micro processor are classified into two categories, i.e. fixed command operations in accordance with ordinary instructions and non-fixed command operations in accordance with branch instructions or the like.

In the case of ordinary instructions, their instruction addresses are calculated during an IF (instruction fetch) stage. On the other hand, in the case of branch instructions, their instruction addresses are calculated during an EX (execution of operation) stage. Branch instructions generally comprise the addressing mode such as a program counter relative branch, an immediate branch, and a register direct branch. Among them, the program counter relative branch is an instruction to execute the operation of the program counter and a relative value at the EX stage. On the other hand, the immediate branch and the register direct branch are instructions both dealing with their branch addresses as immediate values, and hence they execute the processing for setting an immediate value to the program counter in the EX stage (Refer to "H8/327, SH7032 Programming Manuals of Hitachi, or RISC System by K. Ohmori, Kaibundo publishing Co., Ltd.).

As one of this kind of conventional technologies, a micro processor adopting a 5-stage pipeline processing system will be explained hereinafter.

Sequential five stages of this pipeline processing consists of IF (instruction fetch), ID (instruction decode), EX (execution of operation), MA (memory access) and WB (write back) stages. FIG. 5 shows the sequential flow representing the ordinary 5-stage pipeline processing.

FIG. 6 shows the arrangement of a conventional micro processor which comprises a decoder 1 and a data path 2. Data path 2 comprises an operating section 2-1 performing logical operations, arithmetic operations, shift operations and so on, a register file 2-2 storing the operation or computation data, a program counter 2-3 counting the address of the present program, and an address unit 2-4 selectively switching the output to an address bus 4 from operating section 2-1 or program counter 2-3. Operating section 2-1 through address unit 2-4 are respectively controlled in response to the signals of control buses 7-1 through 7-4 fed from decoder 1.

Micro processor designates an address in a memory (not shown) by outputting data through address bus 4 and reads out the instruction stored in the designated address through data bus 3, and then decodes the readout instruction in decoder 1, thereby controlling the data path 2.

An immediate bus 6-1 is provided between decoder 1 and operating section 2-1. Read buses 6-2 and 6-4 are provided to read out the data from register file 2-2. Reference numerals 63 and 6-5 represent input buses of operating section 2-1, while 6-6 represents an output bus of operating section 2-1. Furthermore, reference numeral 6-7 represents a read bus of program counter 2-3, and 6-8 represents an input bus of address unit 2-4. There are also provided a plurality of bidirectional switches 5-1 through 5-6 to switch the above-described buses 61, 6-2, 6-4, 6-5, 6-6 and 6-7.

Regarding operation timing, each stage of IF through WB has the following relationship or correspondence to each of units 2-1 through 2-4 constituting the data path 2.

Program counter 2-3 operates during the IF stage. Decoder 1 (control section) and register file 2-2 operate during the ID stage. Operating section 2-1 operates during the EX stage. Address unit 2-4 operates during the MA stage. And, register file 2-2 operates during the WB stage.

The immediate branch instruction in the above-described conventional micro processor is executed according to the pipeline flow shown in FIG. 7. More specifically, the branch address decoded in decoder 1 is entered from immediate bus 6-1 to operating section 2-1 in EX stage 301 and then is set through output bus 6-6 to program counter 2-3.

Similarly, in executing the register direct branch instruction in the above-described micro processor, the branch address is read out from register file 2-2 and is entered through buses 6-4 and 6-5 to operating section 2-1, and is then set via bus 6-6 to program counter 2-3.

In this manner, according to the above-described conventional micro processor, the branch address is always set to the program counter 2-3 via operating section 2-1 in the response to the branch instruction or in the exceptional treatment. Hence, when seen on the processing stage flow, the above-described micro processor is forced to pass through the EX stage every time, resulting in a significant delay in the processing speed.

Furthermore, FIG. 11 shows the relationship between the instruction processing cycle and each stage in a micro processor adopting the 5-stage pipeline processing system.

In this example, it is now assumed that a conditional branch instruction is fetched in n instruction processing cycle. This conditional branch instruction is decoded in the ID stage. There is a waiting time for waiting the operation result coming from the EX stage of the immediately preceding n−1 instruction processing cycle. Then, at the timing of ID stage of the own n instruction processing cycle, the operation result obtained from the n−1 instruction processing cycle is compared with the branch condition. Thereafter, the processing flow proceeds to the EX stage of the branch address.

For this reason, the ID stage of the n instruction processing cycle requires a relatively long time L equivalent to the sum of a first duration required for waiting the operation result obtained from the n−1 instruction processing cycle and a second duration required for comparing the operation result thus obtained and the condition of the branch instruction. In other words, according to the above-described conventional pipeline processing, the length of a particular stage, if it has the longest time, will make other stages delay in their processing time.

SUMMARY OF THE INVENTION

Accordingly, in view of above-described problems encountered in the related art, a principal object of the present invention is to realize a quick processing in response to a branch instruction and in the exceptional treatment.

Furthermore, another object of the present invention is to effectively execute the comparison processing in response to a given conditional branch so as to shorten the processing time.

In order to accomplish this and other related objects, according to a first aspect of the present invention, a micro processor comprises: a decoder for decoding a branch instruction; an operating section for executing logical, arithmetic, and shift operations; a program counter for counting the address of the present program; a direct-setting bus for allowing the decoder to directly set an immediate value to the program counter without passing through an output bus of the operating section; and a switch for selectively connecting the direct-setting bus or the output bus to the program counter.

According to a second aspect of the present invention, a micro processor comprises: an operating section for executing logical, arithmetic, and shift operations; a register file for storing operation result of the operating section; a program counter for counting the address of the present program; a direct-setting bus for allowing the register file to directly set a register value to the program counter without passing through an output bus of the operating section; and a switch for selectively connecting the direct-setting bus or the output bus to the program counter.

Furthermore, a third aspect of the present invention provides a pipeline processing apparatus for dividing each instruction processing cycle into a plurality of sequential stages, and executing the processing of respective stages in parallel at timings overlapped partly. This pipeline processing apparatus comprises: a means for fetching a branch instruction; and a means for executing a comparison of branch condition relating to the branch instruction at a timing for executing an operating stage of an instruction processing cycle which fetched the branch instruction, the operating stage of the instruction processing cycle being provided to calculate a branch address.

According to the features of preferred embodiments, it is desirable that the instruction processing cycle which fetched the branch instruction calculates the branch address without waiting comparison result of branch condition, so that the calculation of the branch address and the comparison of the branch condition can be executed in a concurrent manner.

Furthermore, a fourth aspect of the present invention provides a decoding apparatus comprising a group of registers and a group of decoders, for controlling each unit in a data path so as to control a plurality of sequential stages of a pipeline processing, wherein a comparator for judging branch condition relating to a branch instruction is disposed in parallel to a register dedicated to an operating stage of the pipeline processing.

According to the features of the preferred embodiments, it is preferable that the registers comprise a condition register for memorizing decoding result of the branch instruction at a decode stage and a flag register for memorizing an operation result flag at the operation stage through the data path, and the data memorized in the condition register and the flag register are entered into the comparator.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
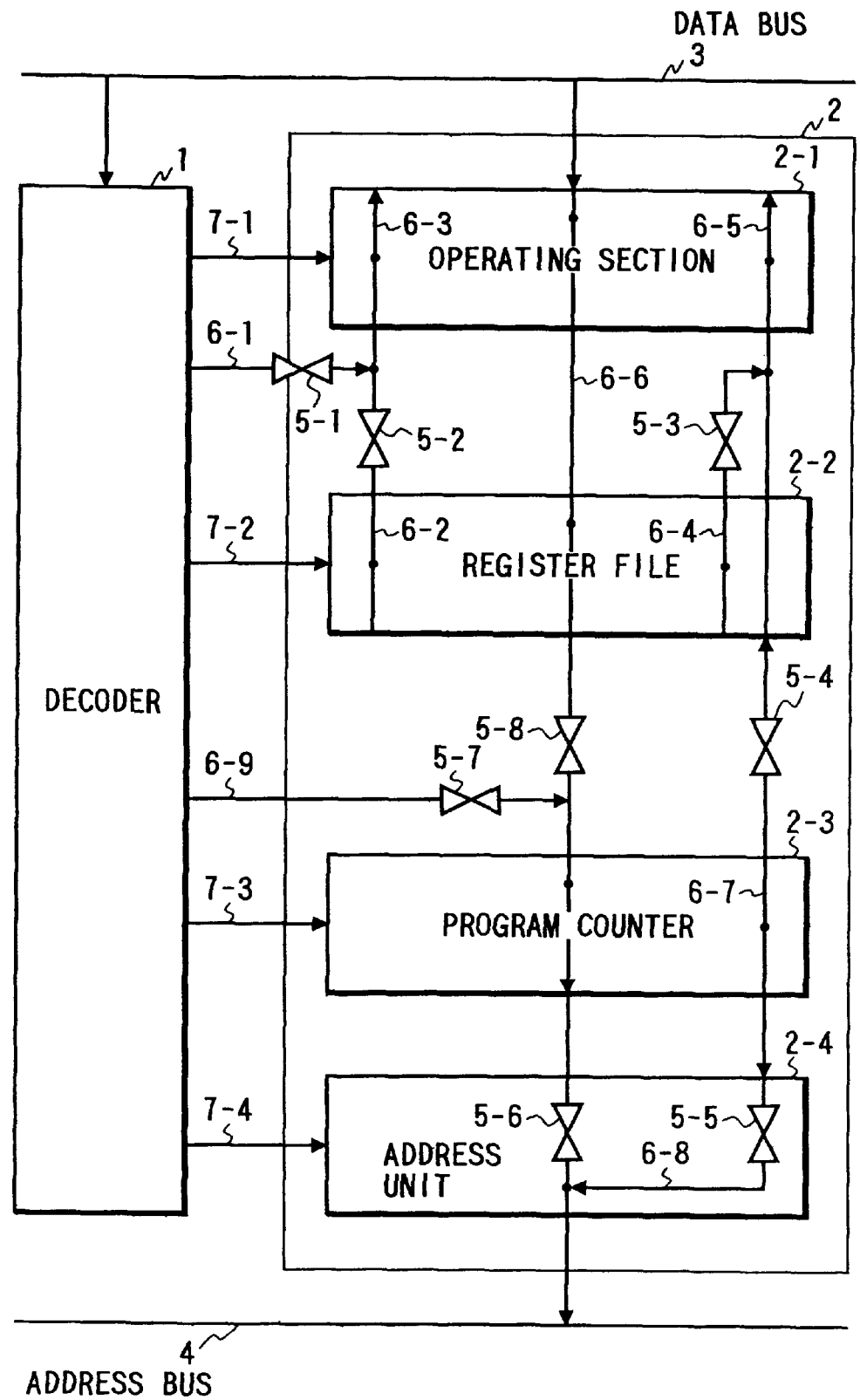
FIG. 1 is a schematic block diagram showing the overall arrangement of a micro processor in accordance with a first embodiment of the present invention.

Preferred embodiments of the present invention will be explained in greater detail hereinafter with reference to the accompanying drawings. Identical parts are denoted by the same reference numerals throughout the views.

FIG. 1 is a block diagram showing a micro processor in accordance with a first embodiment of the present invention. This micro processor realizes the speed-up of the processing in response to the immediate branch instruction.

Figure 6:
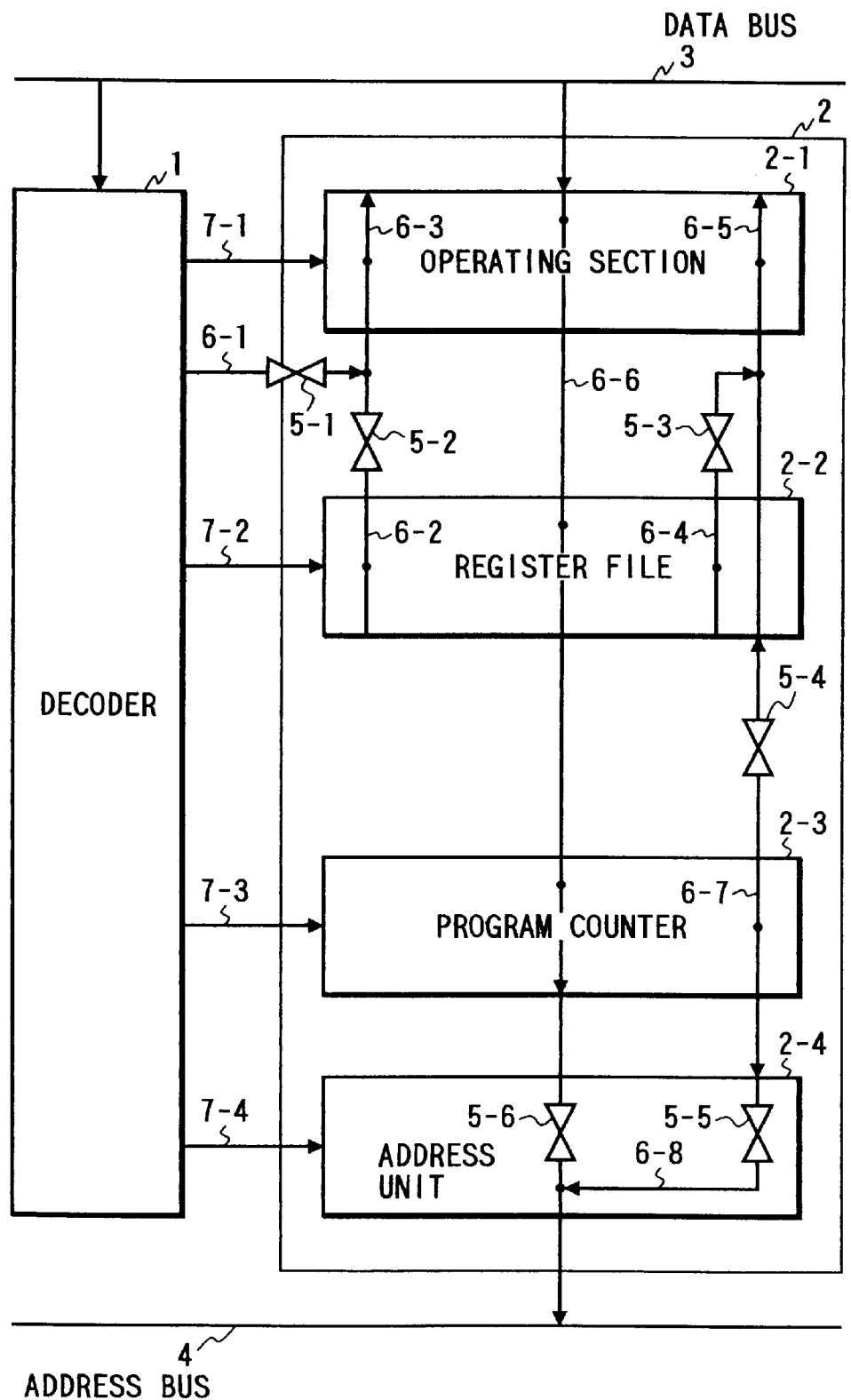
FIG. 6 is a schematic block diagram showing the overall arrangement of the conventional micro processor.
Figure 7:
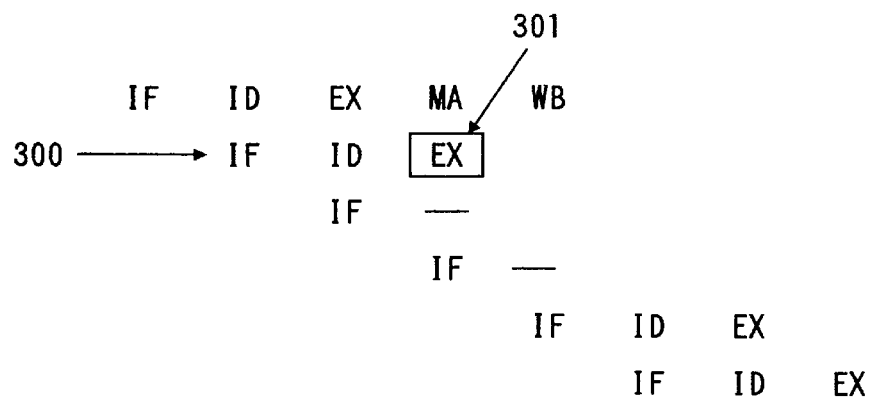
FIG. 7 is a view showing the operation of a pipeline processing system in the conventional micro processor.

The micro processor of the first embodiment, as understood from the comparison between FIGS. 1 and 6, comprises an immediate bus 6-9 associated with a bidirectional switch 5-7 and a bidirectional switch 5-8 provided in the output bus 6-6 in addition to the components provided in the conventional micro processor shown in FIG. 6. Immediate bus 6-9 with bidirectional switch 5-7 has a function of allowing decoder 1 to directly set an immediate value to program counter 2-3.

Figures 2, 5:
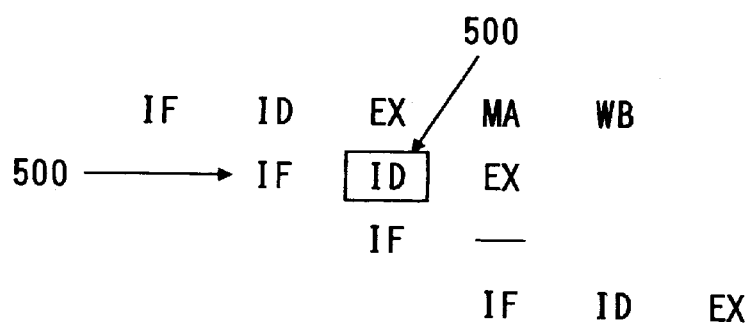
FIG. 2 is a view showing the operation of a pipeline processing system in response to an immediate branch instruction in accordance with the first embodiment of the present invention.
FIG. 5 is a view showing the operation of a pipeline processing system in a conventional micro processor.

FIG. 2 shows the pipeline flow of the immediate branch processing in this micro processor. More specifically, an immediate branch instruction is fetched at IF stage 500, then this instruction is decoded by decoder 1 at ID stage 501 and at the same time this instruction is directly set through immediate bus 6-9 to program counter 2-3. Accordingly, there is no necessity of executing the next EX stage. In other words, the processing can be started from the n+2 processing cycle by directly fetching the instruction from the branch address. In this case, switch 5-7 is opened and switch 5-8 is closed, thereby switching the input bus of data to program counter 2-3.

In this manner, according to the first embodiment, the immediate branch processing can be quickly performed.

Figure 3:
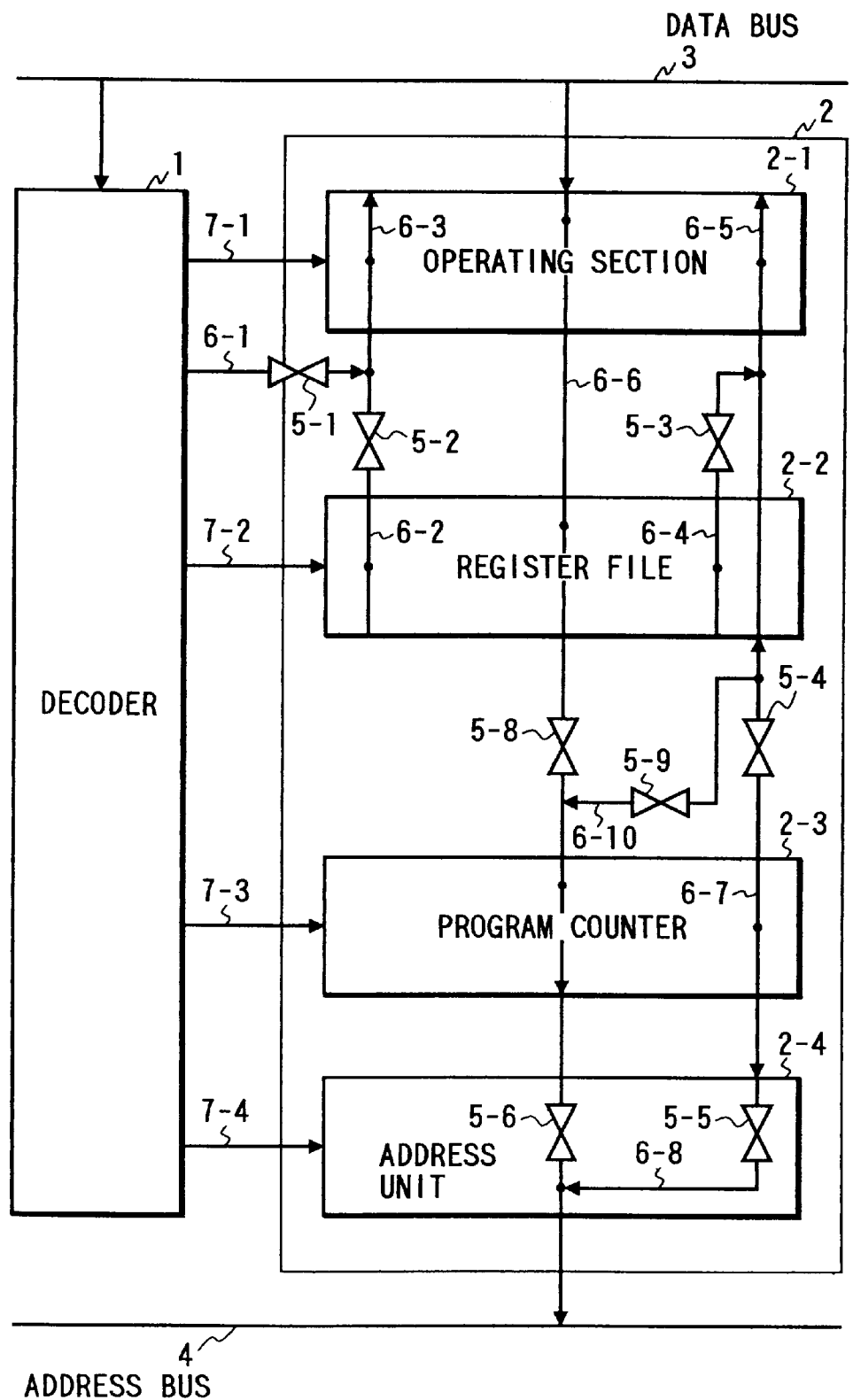
FIG. 3 is a schematic block diagram showing the overall arrangement of a micro processor in accordance with a second embodiment of the present invention.

FIG. 3 is a block diagram showing a micro processor in accordance with a second embodiment of the present invention. This micro processor realizes the speed-up of the processing in response to the register direct branch instruction.

The micro processor of the second embodiment, as understood from the comparison between FIGS. 3 and 6, comprises bidirectional switch 5-8 provided in the output bus 6-6 of operating section 2-1 in the same manner as the first embodiment in addition to the components of the conventional micro processor shown in FIG. 6. Furthermore, the micro processor of the second embodiment comprises a bus 6-10 connecting an intermediate point between bidirectional switch 5-4 and operating section 2-1 and an intermediate point between bidirectional switch 5-8 and program counter 2-3. Bus 6-10, associated with a bidirectional switch 5-9, has a function of allowing the direct setting to program counter 2-3.

When the register direct branch processing is performed, bidirectional switches 5-3 and 5-9 are opened while bidirectional switch 5-8 is closed. With this switching operation, the data (register value) in the register file 2-2 is directly set to program counter 2-3 via a direct-setting bus 6-10. Accordingly, in the same manner as in the first embodiment, passing through operating section 2-1 is no longer required to complete the setting of the branch address at the stage preceding the EX stage. Thus, the branch processing can be immediately started.

In this manner, according to the second embodiment, the register direct branch processing can be quickly performed.

Figure 4:
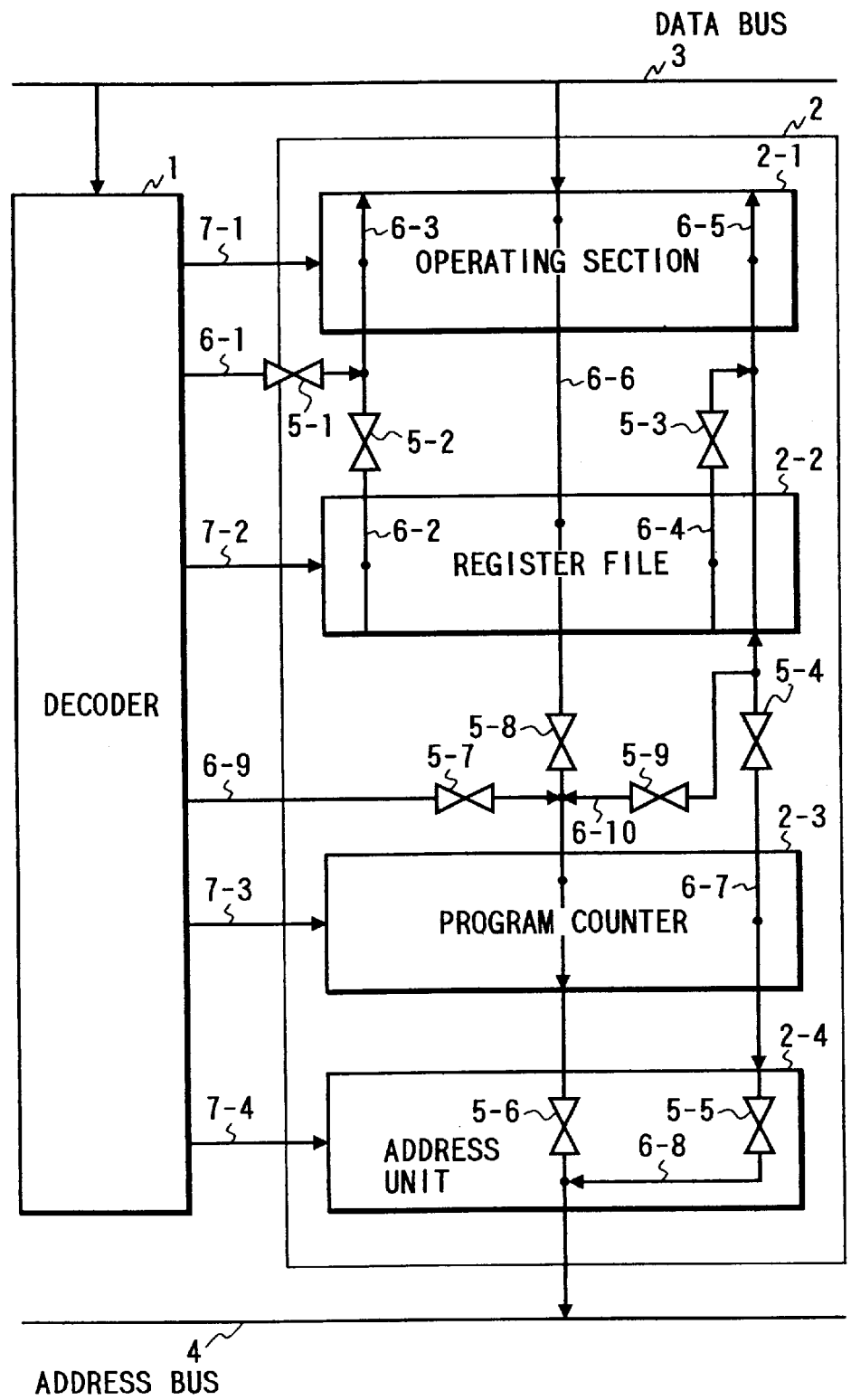
FIG. 4 is a schematic block diagram showing the overall arrangement of a micro processor in accordance with a third embodiment of the present invention.

FIG. 4 is a block diagram showing a micro processor in accordance with a third embodiment of the present invention which is substantially the combination of the above-described first embodiment and the second embodiment.

According to this third embodiment, it becomes possible to realize the speed-up the operation of the micro processor in both the immediate branch processing and the register direct branch processing.

A fourth embodiment of the present invention will be explained with reference to FIGS. 8 through 10.

Figure 8:
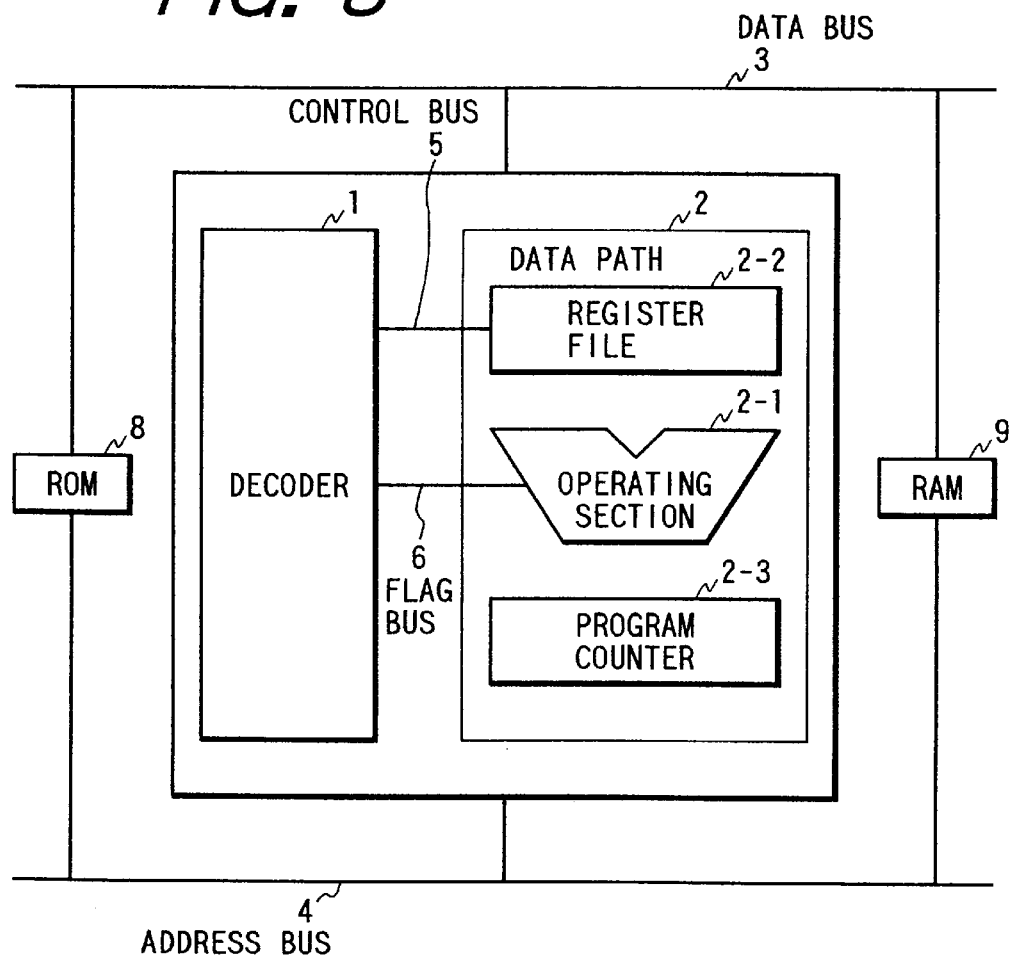
FIG. 8 is a schematic block diagram showing the overall arrangement of a micro processor in accordance with a fourth embodiment of the present invention.

FIG. 8 shows the arrangement of the micro processor in accordance with the fourth embodiment. The micro processor of the fourth embodiment comprises decoder 1 which reads out an intended instruction from a memory (ROM 8 or RAM 9) via data bus 3 in accordance with the data of address bus 4 and decodes the readout instruction, and data path 2 controlled by decoder 1 via a control bus 5.

Data path 2 comprises operating section 2-1 performing logical operations, arithmetic operations, shift operations and so on, register file 2-2 storing the computation data, and program counter 2-3 counting the address of the present program. The flag of operation result is supplied to decoder 1 via a flag bus 6.

Figure 9:
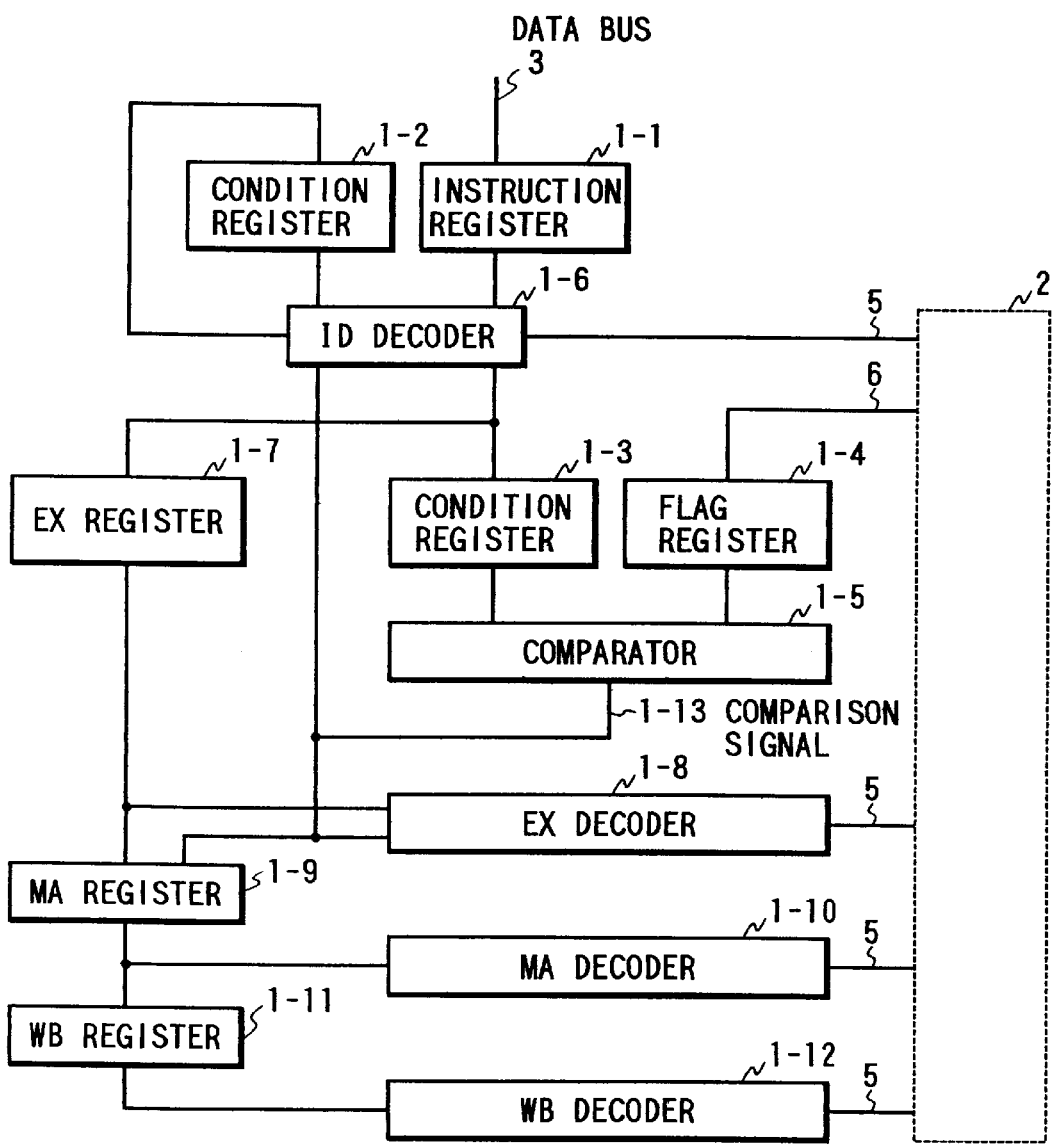
FIG. 9 is a block diagram showing the detailed arrangement of a decoder unit incorporated in the micro processor in accordance with the fourth embodiment of the present invention.

FIG. 9 shows the detailed arrangement of decoder 1. An instruction register 1-1 stores the instruction sent through data bus 3. A condition register 1-2 varies in response to the value of instruction register 1-1, the present control condition and the comparison signal 1-13. A condition register 1-3 memorizes the condition of the conditional branch instruction. A flag register 1-4 memorizes the operation result flag entered from data path 2 through flag bus 6. A comparator 1-5 compares the memorized data between condition register 1-3 and flag register 1-4, and then generates a comparison signal 1-13 based on the comparison result. EX register 1-7, MA register 1-9 and WB register 1-11 store the control information relating to the EX stage, MA stage and WB stage, respectively. ID decoder 1-6, EX decoder 1-8, MA decoder 1-10 and WB decoder 1-12 decode the control information of respective stages and send out the control signals to corresponding units of data path 2 via control bus 5. Each of the above-described registers operates in synchronism with a system clock (not shown).

The characteristic arrangement of decoder 1 in accordance with this fourth embodiment resides in the provision of comparator 1-5. Comparator 1-5 is disposed in parallel with EX register 1-7. Accordingly, the forth embodiment of the present invention makes it possible to execute the above-described comparison in this comparator 1-5 independently of the control and execution of the EX stage by EX register 1-7 and EX decoder 1-8.

Figure 10:
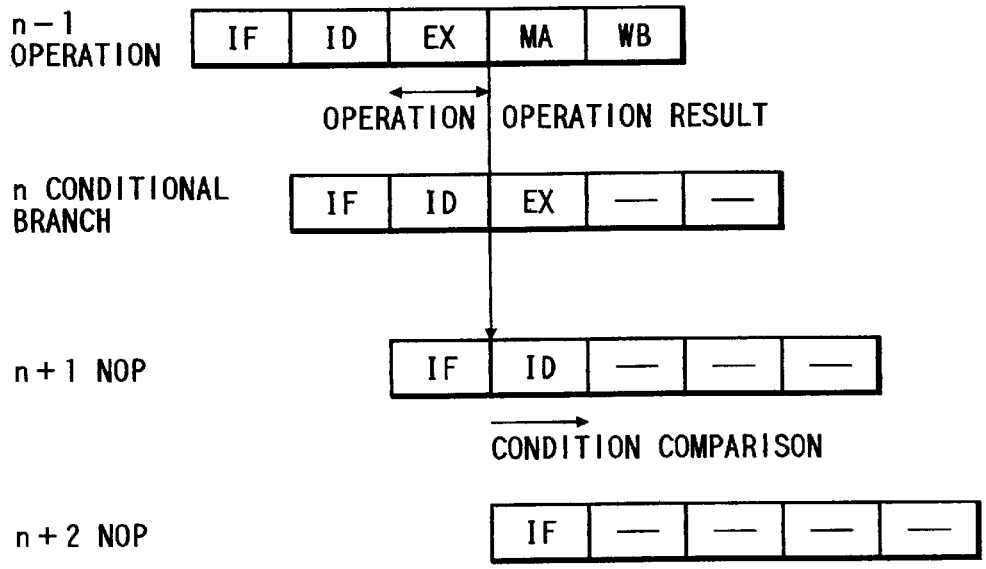
FIG. 10 is a view showing the operation of a pipeline processing system in accordance with the forth embodiment of the present invention.
Figure 10:
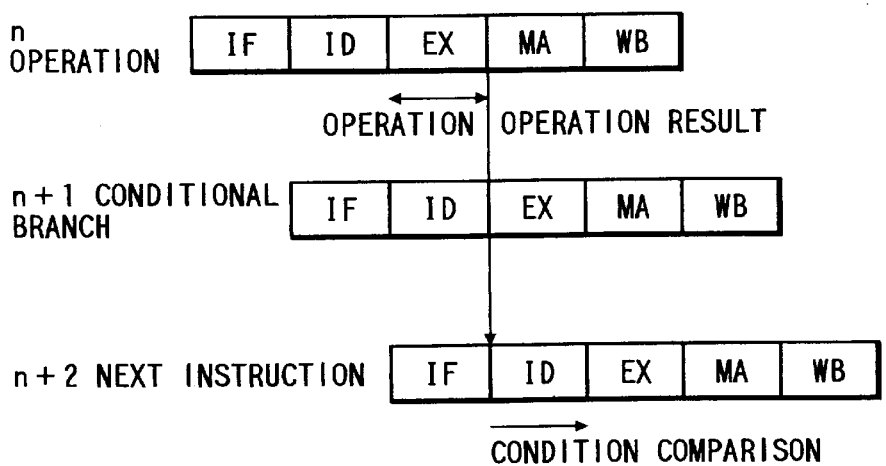
Figure 11:
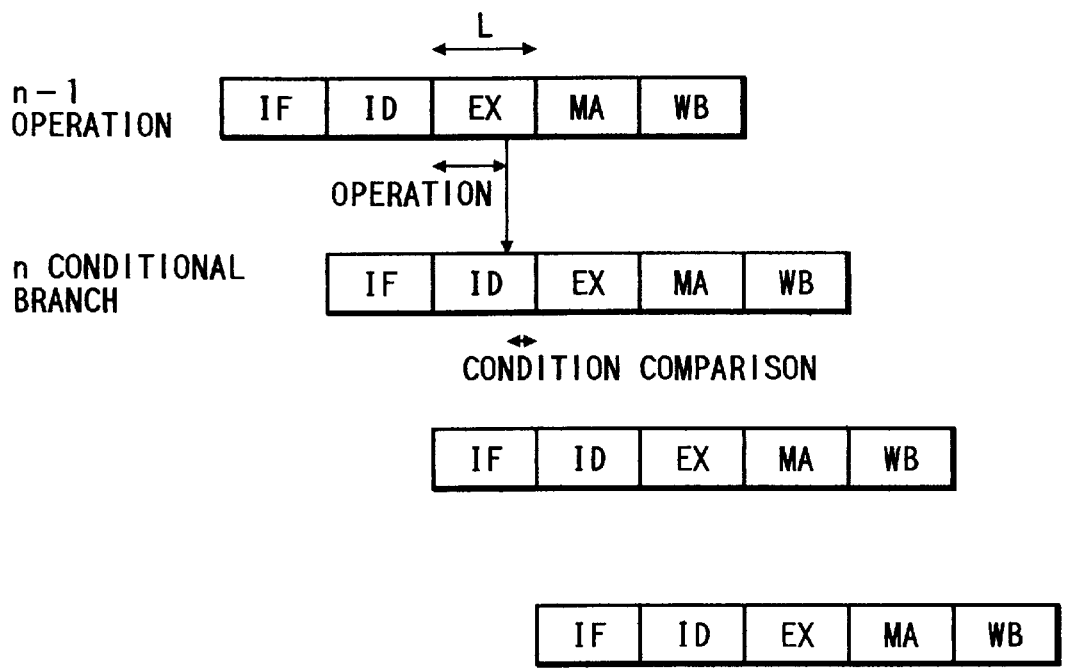
FIG. 11 is a view showing the operation of a pipeline processing system in the conventional micro processor.

FIG. 10 shows the pipeline processing flow in the micro processor comprising the decoder shown in FIG. 9.

According to this micro processor, each instruction processing cycle is dissected or divided into sequential five stages of IF (instruction fetch), ID (instruction decode), EX (execution of operation), MA (memory access) and WB (write back). Respective instruction processing cycles are processed in parallel or in a concurrent manner. In other words, a plurality of instruction processing cycles are executed at timings overlapped partly, so as to realize a 5-stage pipeline processing system.

As shown in (A) of FIG. 10, when a conditional branch instruction is fetched at n instruction processing cycle, the ID stage of this instruction processing cycle performs only the decoding of instruction without performing the comparison between the operation result of n−1 cycle and the branch condition, and then the processing flow directly proceeds to the EX stage to calculate the branch address.

The branch condition of the conditional branch instruction is sent from ID decoder 1-6 to condition register 1-3 and is stored there. The operation result flag of the n−1 instruction processing cycle is sent from data path 2 through flag bus 6 to flag register 1-4 and is stored there. Then, the branch condition stored in condition register 1-3 and the operation result flag stored in flag register 1-4 are both entered into comparator 1-5. Comparator 1-5 generates a comparison signal representing the result on whether the branch condition is established or not established. This comparison is executed at the time when EX register 1-7 and EX decoder 1-8 cooperatively cause the units of data path 2 to execute the processing for the branch address.

Accordingly, it is regarded that, in the flow (A) of FIG. 10, the comparison for checking the establishment/non-establishment of the branch condition is executed at the ID stage of the n+1 instruction processing cycle.

When the branch condition is established as a result of the above-described comparison, execution of the EX stage in the n+1 processing cycle is abandoned in response to the output of comparator 1-5 sent to EX decoder 1-8. Similarly, executions of the MA stage and the WB stage are abandoned in response to the output of comparator 1-5 sent to MA register 1-9 and WB register 1-11, respectively.

Then, the next n+2 instruction is changed to the NOP instruction when the value stored in condition register 1-2 is varied in response to comparison signal 1-13. Subsequently, in n+3 instruction processing cycle, the branch address calculated at the EX stage of the n instruction processing cycle is sent out to address bus 4 to jump to the designated address, thereby changing the program.

Executions of the MA stage and the WB stage in the n instruction processing cycle are abandoned in response to comparison signal 1-13, too.

On the other hand, when the branch condition is not established, the next n+1 instruction is executed without any jump, as shown in (B) of FIG. 10.

As explained above, the length of the ID stage in the instruction processing cycle which fetched the conditional branch instruction is influenced only by the operation time not by the sum of the operation time and the comparison time. Hence, it becomes possible to shorten the entire processing time.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A pipeline processing apparatus for performing processing operations in a succession of processing cycles, in which each processing cycle is composed of a succession of stages that include an instruction fetch stage for fetching an instruction, an instruction decoding stage for decoding the instruction fetched by the instruction fetch stage associated with the same cycle and an execution stage for executing an operation dependent on the instruction decoded in the same cycle, and in which each of the succession of processing cycles has a beginning, the beginning of each processing cycle precedes in time the beginning of a respective succeeding processing cycle, each processing cycle overlaps in time the respective succeeding processing cycle, and the instruction fetch stage of at least one processing cycle is operative to fetch a branch instruction, the branch instruction having a branch condition, said pipeline processing apparatus comprising:

first means for decoding, in the instruction decoding stage of the at least one processing cycle, the branch instruction fetched by the instruction fetch stage of the at least one processing cycle without performing a branch condition comparison for checking establishment of the branch condition;

second means for effecting, in the execution stage of the at least one processing cycle, a calculation of a branch address dependent on the branch instruction decoded in the instruction decoding stage of the at least one cycle; and third means for executing the branch condition comparison in the instruction decoding stage of a processing cycle succeeding the at least one processing cycle concurrently with the calculation of the branch address in the execution stage of the at least one processing cycle.

2. A decoding apparatus for decoding information in respective stages of a succession of processing cycles, in which each processing cycle is composed of a succession of stages that include an instruction fetch stage for fetching an instruction, an instruction decoding stage for decoding the instruction fetched by the instruction fetch stage associated with the same cycle and an execution stage for executing an operation dependent on the instruction decoded in the instruction decoding stage of the same cycle, and in which each of the succession of processing cycles overlaps in time a respective succeeding processing cycle, and the instruction fetch stage of at least one processing cycle is operative to fetch a branch instruction, the branch instruction having a branch condition, said decoding apparatus comprising:

a plurality of register units and a plurality of decoder units connected to an operating section of a data path via a data bus for processing information in each processing cycle stage; and a comparator for judging a branch condition, wherein:

said plurality of register units include an execution register unit for processing the information in the execution stage of each processing cycle, said execution register unit being connected in parallel with said comparator; and said decoding apparatus is operative for concurrently calculating a branch address in said execution register unit and judging establishment of a branch condition in said comparator in response to a fetched branch instruction so that the branch condition comparison for the branch instruction of the at least one processing cycle is executed in the instruction decoding stage of a processing cycle which follows the at least one processing cycle concurrently with calculation of the branch address performed in said execution register from information in the execution stage of the at least one processing cycle.

3. The decoding apparatus of claim 2 wherein said plurality of registers further include:

a condition register connected to said comparator for storing a decoding result of said branch instruction decoded in the decoding stage of the at least one processing cycle; and a flag register connected to said comparator for storing an operation result flag representing a result of the operation executed in the execution stage of the at least one processing cycle, wherein said comparator is operative for comparing the decoding result stored in said condition register with the operation result flag stored in said flag register.

* * * * *